United States Patent [19]

Bengtsson

[11] Patent Number: 4,553,699
[45] Date of Patent: Nov. 19, 1985

[54] IRRIGATION SYSTEM

[76] Inventor: Alvar Bengtsson, Pilevägen 4, S-237 00 Bjärred, Sweden

[21] Appl. No.: 460,236
[22] PCT Filed: May 14, 1982
[86] PCT No.: PCT/SE82/00174
  § 371 Date: Jan. 14, 1983
  § 102(e) Date: Jan. 14, 1983
[87] PCT Pub. No.: WO82/03964
  PCT Pub. Date: Nov. 25, 1982

[30] Foreign Application Priority Data

May 18, 1981 [SE] Sweden ............................ 8103079

[51] Int. Cl.$^4$ ............................................. B05B 3/00
[52] U.S. Cl. ................................. 239/183; 239/191
[58] Field of Search ............... 239/181, 183, 184, 185, 239/191, 711

[56] References Cited

U.S. PATENT DOCUMENTS

| | | | |
|---|---|---|---|
| 3,575,200 | 4/1971 | Imeson | 239/183 |
| 3,679,135 | 7/1972 | Grosch | 239/183 |
| 3,841,561 | 10/1974 | Lacey | 239/191 X |
| 3,970,102 | 7/1976 | Harvey | 239/183 X |
| 4,182,493 | 1/1980 | Murray | 239/183 |

FOREIGN PATENT DOCUMENTS 2433808 1/1975 Fed. Rep. of Germany .
395338 11/1977 Sweden .

Primary Examiner—Andres Kashnikow
Assistant Examiner—Daniel R. Edelbrock
Attorney, Agent, or Firm—Shapiro and Shapiro

[57] ABSTRACT

A self-propelled irrigation carriage (1) comprised by an irrigation system and provided with a spraying boom or a high-volume discharge sprayer is movable back and forth on drive wheels (2) between the ends of the area to be irrigated, along a pipe-line (4) laid on the ground. The water is transferred, via a unit (5) connected to said carriage (1) and movable together therewith, to a fluid motor (6) mounted on the carriage for driving the wheels (2) and to one or more spray nozzles on the spraying boom or discharge sprayer. The pipe-line (4) is provided with equidistantly spaced apart clamps (8), each of which accommodates a non-return valve (9) extending through the wall of the pipe-line. The transfer unit (5) has two chains which are passed around sprocket wheels and from which cups (12) are suspended at intervals corresponding to the interspaces between the clamps (8). The cups (12) can be moved in succession into correct position in register with the adjacent clamp (8) and are provided each with one projection depressing the non-return valve (9) when the cup is in correct position.

6 Claims, 4 Drawing Figures

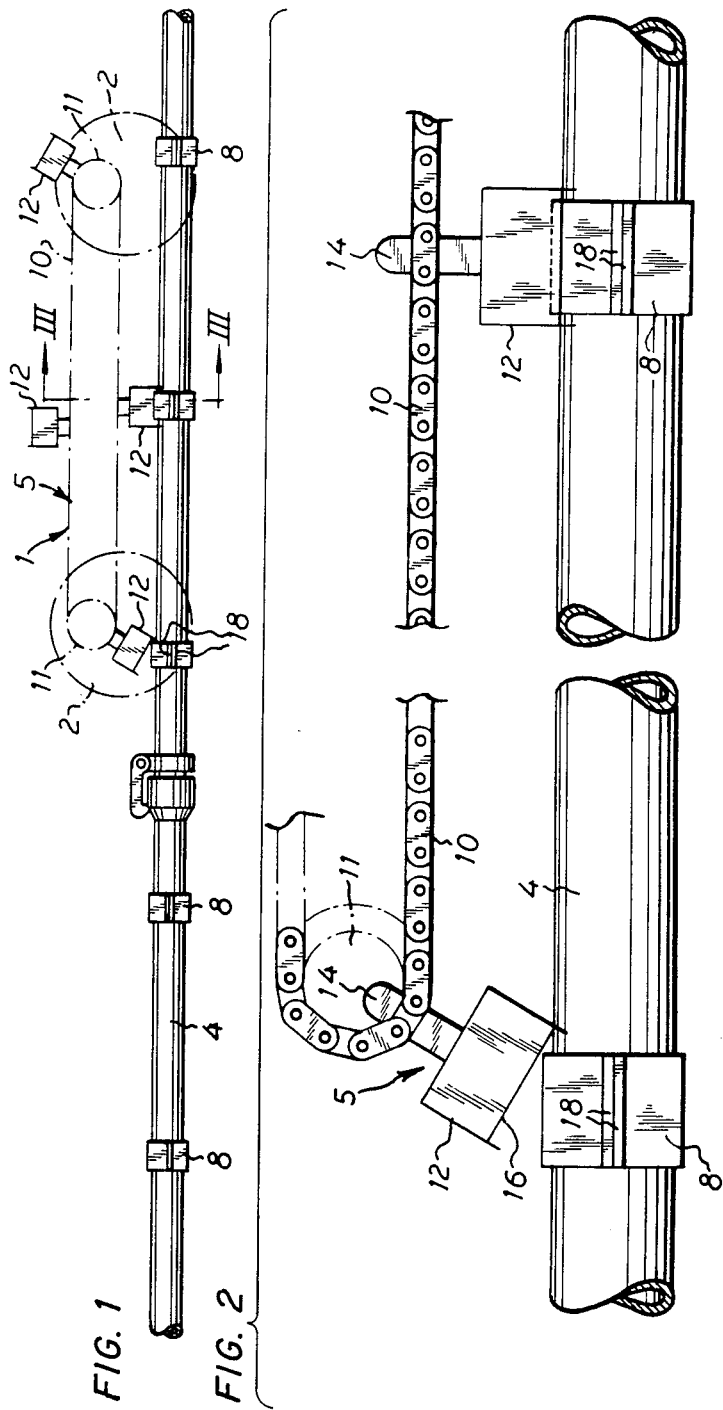

IRRIGATION SYSTEM

The present invention relates to an irrigation system comprising on one hand a self-propelled irrigation carriage provided with drive wheels and a spraying boom or high-volume discharge sprayer and, on the other hand, a pipeline which is laid on the ground and along which the carriage is movable back and forth and from which water can be transferred, via a transfer unit connected to said carriage and movable together therewith, to a fluid motor or the like which also is mounted on the carriage and adapted to drive the drive wheels, and from there to one or more spray nozzles on the spraying boom or discharge sprayer.

In a known irrigation system of the above-mentioned type, the transfer unit of the irrigation carriage is formed of an elongate chamber which sealingly encloses a portion of the pipe-line during its movement therealong. Thus, the chamber more or less slides along the pipe-line which, therefore, must have an entirely smooth outer surface without obstructing joints. As a result, the pipe-line will be unnecessarily expensive in manufacture and, furthermore, must be laid absolutely straight. A further disadvantage is that the pipe-line, because of the sliding engagement with the chamber, is subjected to wear, and the removal and replacement of a damaged or worn pipe-like section is both time-consuming and expensive.

The present invention has for its object to obviate the above-mentioned disadvantages, which is accomplished in a manner which is as ingenious as it is simple in that the pipe-line is provided on its outer surface with equidistantly spaced apart clamps each having a valve extending through the pipe-line wall, and that the transfer unit comprises at least one chain or the like which is passed over guide pulleys and on which there are mounted, at intervals corresponding to the interspaces between the clamps, connectors which are successively movable into correct position opposite an adjacent clamp and are provided each with one actuator which opens the respective valve when the connector is in correct position.

In this manner, the pipe-line may be manufactured of commercially available quickly coupled light-metal pipes or hoses, thereby reducing the costs for making and laying the pipe-line. Moreover, the pipe-line need not be anchored in the ground and thus is readily moved from one field to another.

During movement of the carriage along the pipe-line, the connectors are stationary relative to the pipe-line which thus is not subjected to wear, and consequently there is no risk of any leakage between the connectors and the clamps.

A further advantage is that a defective pipe-line is readily repaired simply by replacing the damage pipe section or clamp.

The features of the present invention may best be understood by reference to the following description taken in connection with the accompanying drawings which illustrate an embodiment which, at present, is especially preferred.

FIG. 1 is a schematic lateral view of a self-propelled irrigation carriage and a pipe-line associated therewith.

FIG. 2 is a further schematic view of a part of the carriage and the pipe-line as shown in FIG. 1 on a larger scale.

Figure 4:
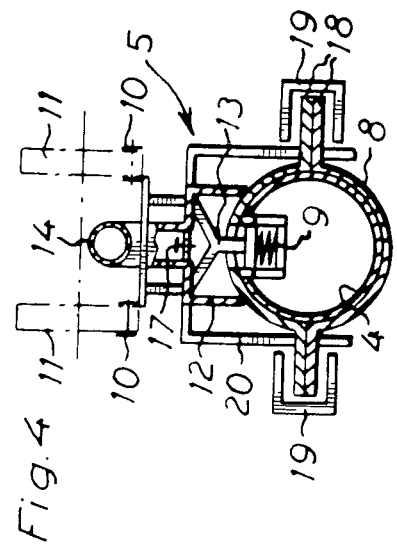
FIG. 4 shows a part of FIG. 3 on a larger scale.
Figure 3:
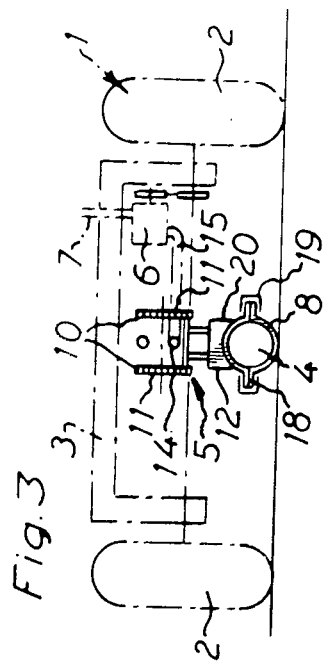
FIG. 3 is a section substantially along line III—III in FIG. 1.

The self-propelled irrigation carriage shown in the drawings and generally designated 1 comprises a frame 3 which is supported by drive wheels 2 and on which a spraying boom or high-volume discharge sprayer (not shown) of more or less conventional design is mounted.

The self-propelled irrigation carriage 1 is movable back and forth between the ends of the area to be irrigated, along a pipe-like 4 which is laid on the ground and preferably consists of commercially available quick-coupled standard-type light-metal pipes or hoses which can be laid directly on the ground and thus are readily moved from one location to another.

A transfer unit generally designated 5 is connected with the irrigation carriage 1 and movable together therewith. The transfer unit 5 serves to transfer water to a fluid motor 6 which is mounted on the carriage and, via a transmission (not shown), is connected with the drive wheels 2 for driving these wheels and thus the carriage 1. The outlet of the fluid motor 6 is connected, via a conduit 7, to one or more spray nozzles (not shown) on the spraying boom or the high-volume discharge sprayer for spraying water over the surface to be irrigated.

As will be seen from the drawings, the pipe-line is provided with clamps 8 equidistantly spaced apart on the pipe-line and provided each with one non-return valve 9 extending through the pipe-line wall. As shown in FIG. 4, each clamp has cooperable parts that embrace the outer surface of the pipe-line. In the embodiment illustrated, the transfer unit 5 comprises two chains 10 which are passed around two sprocket wheels 11 and, at intervals corresponding to the interspaces between the clamps 8, carry connectors in the form of downwardly open cups 12. These cups can be moved in succession into correct position in register with the adjacent clamp 8 and are provided each with one actuator in the form of a projection 13 which is mounted therein and depresses the valve 9 when the cup 12 is in correct position.

As shown in the drawings, the chains 10 are endless, and each chain forms an elongated loop with a lower elongated side of the loop parallel to the pipe-line at a constant height above the pipe-line established by the carriage 1, which is guided along the pipe-line as later described. The cups 12 extend downwardly from the lower elongated side of the loops and are stationary relative to the pipe-line while sealed against the pipe-line and while the carriage moves along the pipe-line.

The cups 12 are interconnected by a hose-shaped chamber 14 which, via a flexible coupling 15, communicates with the fluid motor and the spray nozzles (not shown). As will be seen from the drawings, and as has been mentioned before, the cups 12 are open downwardly and at the lower edge are provided with a seal 16 (schematically indicated in the drawings) sealing against the pipe-line 4. To prevent the water from flowing the wrong way out of the cup 12, when this is not in the correct position opposite the associated clamp 8, a non-return valve 17 is provided in the outlet of each cup.

The clamps 8 have protruding flanges 18 for engaging guide means 19 provided on the irrigation carriage 1 in order to hold the carriage 1 and the pipe-line 4 in mutually correct positions so that substantially U-shaped yokes 20 mounted on the cups 12 may be caught by the flanges 18 provided on the clamps 8 in order to guide the cups 12 into the correct position in register with said clamps 8.

The self-propelled irrigation carriage 1 described above and illustrated in the drawings operates as follows. The water flows through the cup 12 which is in a position such that the valve 9 in the associated pipe-line clamp 8 and in register with the said cup, has been opened, and from there through the fluid motor 6 for driving the carriage 1. The flanges 18 on the clamps 8 intercept the yokes 20 on the cups 12 which thus will travel along the pipe-line 4 and alternatingly open and close the valves 9. When the carriage 1 has arrived at the end of the pipe-line, the direction of rotation of the fluid motor 6 is reversed by means of a projection (not shown) mounted on the pipe-line. In this manner, the carriage 1 will automatically move back and forth across the field along the pipe-line 4.

As has been mentioned before, the irrigation carriage may be connected to a spraying boom or a high-volume discharge sprayer. If the carriage is connected to a boom, the boom may have several sections according to the width of the area to be irrigated. Each such section may be driven by a separate fluid motor which, via a drive shaft, drives pairs of wheels at both ends of the boom section. Each pair of wheels may be provided with a friction clutch which, upon angular changes between different boom sections, is actuated by an arm such that one of said pairs of wheels briefly stops until the boom sections are in correct mutual position.

Naturally, the invention is not restricted to the embodiment described above and illustrated in the drawings, but may be modified in several ways within the scope of the protection claimed.

For instance, it is possible to use as the connector, instead of the chains 10 and the cups 12, an endless track or the like having a continuous traveling chamber of suitable design facing the pipe-line 4.

I claim:

1. An irrigation system comprising a self-propelled carriage provided with drive wheels and a fluid motor for driving said drive wheels, a pipe-line which is laid on the ground and along which the carriage is movable, a transfer unit connected to said carriage and moved together therewith, said transfer unit being adapted to transfer water from said pipe-line to said fluid motor and to ground to be irrigated, said pipe-line being provided on its outer surface with a plurality of clamp means spaced apart equidistantly along the length of said pipe-line, each clamp means having cooperable parts that embrace the outer surface of the pipe-line and having a valve extending through the pipe-line wall, said transfer unit having endless chain means passed over spaced guide pulleys and forming elongated loop means with a lower elongated side of said loop means parallel to said pipe-line at a constant height above said pipe-line, said chain means carrying, at intervals corresponding to the spaces between successive clamp means, connectors which are successively moved into alignment with said clamp means, each connector being provided with an actuator which opens the valve of a clamp means aligned with the connector, each connector having a cup open outwardly from said chain means and provided at an outer edge with a seal for sealing the connector against the pipe-line, said cups extending downwardly from said lower elongated side of said loop means and being stationary relative to said pipe-line while sealed against the pipe-line and while the carriage moves along the pipe-line, and said cups being interconnected hydraulically with each other and with said fluid motor, said carriage and said pipe-line having cooperable means for guiding said carriage along said pipe-line.

2. An irrigation system as claimed in claim 1, wherein said cooperable means comprises flanges on said clamp means and guide elements on said carriage that engage said flanges.

3. An irrigation system as claimed in claim 2, wherein said guide elements comprise channels embracing said flanges.

4. An irrigation system as claimed in claim 2, wherein said cups have yokes the engage the flanges of said clamp means for aligning the cups with the clapm means.

5. An irrigation system as claimed in claim 1, wherein said actuator comprises a projection disposed in the respective cup and positioned to depress the valve of a clamp means when the cup is aligned therewith.

6. An irrigation system as claimed in claim 1, wherein each cup has an outlet with a non-return valve disposed therein for preventing back flow through the cup.

* * * * *